United States Patent [19]

Sammells

[11] Patent Number: 4,749,634
[45] Date of Patent: Jun. 7, 1988

[54] HIGH TEMPERATURE STORAGE BATTERY

[75] Inventor: Anthony F. Sammells, Naperville, Ill.

[73] Assignee: Eltron Research, Inc., Aurora, Ill.

[21] Appl. No.: 935,736

[22] Filed: Nov. 28, 1986

[51] Int. Cl.$^4$ ............................................. H01M 6/20
[52] U.S. Cl. ........................................ 429/94; 429/112; 429/120; 429/193; 429/199; 429/218
[58] Field of Search .............. 429/104, 103, 112, 120, 429/193, 199, 218, 94, 191

[56] References Cited

U.S. PATENT DOCUMENTS 4,294,898 10/1981 Hartstein ...................... 429/193 X
4,357,215 11/1982 Goodenough et al. ........ 429/193 X

*Primary Examiner*—Anthony Skapars
*Attorney, Agent, or Firm*—Thomas W. Speckman; Ann W. Speckman

[57] ABSTRACT

A high temperature, electrochemically reversible cell system comprising a divalent cation conducting solid electrolyte in contact with a positive electrode and a solid-state negative electrode contacting a divalent cation conducting molten salt providing ionic mediation to the solid electrolyte is disclosed. Suitable divalent cations include $Ca^{2+}$; $Sr^{2+}$; $Ba^{2+}$; $Zn^{2+}$; $Cd^{2+}$; $Pb^{2+}$; $Hg^{2+}$; and $Mn^{2+}$. According to a preferred embodiment, $Ca^{2+}$ beta"-alumina solid electrolyte is in solid-state contact to a transition metal doped $Ca^{2+}$ beta"-alumina positive electrode, and a solid-state calcium alloy negative electrode contacts a calcium halide molten salt providing ionic mediation to the solid-state $Ca^{2+}$ beta"-alumina electrolyte.

20 Claims, 1 Drawing Sheet

HIGH TEMPERATURE STORAGE BATTERY

This invention was made as a result of work under NSF-SBIR Award No. 8460002 awarded by the National Science Foundation. The Government has certain rights in this invention.

BACKGROUND OF THE INVENTION

1. Field of the Invention

The present invention relates to rechargeable galvanic cells comprising a divalent cation conducting solid electrolyte in contact with a positive electrode, and a solid-state negative electrode contacting a molten salt providing ionic mediation to the solid electrolyte. Galvanic cells of this type may be assembled to form advanced storage battery systems for use in utility load leveling, electric vehicle propulsion, and aerospace power source applications.

2. Description of the Prior Art

Both ambient and high temperature battery systems are currently being considered for applications such as electric vehicle propulsion and utility load leveling management. Ambient temperature batteries are typified by aqueous electrolyte systems such as lead-acid, zinc-chlorine, zinc-bromine and nickel-zinc. Also, there has been increasing interest in secondary lithium non-aqueous systems such as $Li/TiS_2$ and and $Li/CuCl_2$. Ambient temperature aqueous electrolyte systems generally demonstrate faster electrode kinetics, and can deliver higher power densities than lithium non-aqueous systems, although they generally possess lower volumetric energy densities.

The discovery that sodium ion conductivity in sodium beta-alumina and beta"-alumina type materials at room temperature is comparable to conductivity in aqueous solutions greatly enhances the applications of high conductivity solid electrolytes. Most work has focused on the high cationic conductivity in solids conducting monovalent ions, but it is now known that ion exchange reactions result in replacement of monovalent sodium ions in sodium beta"-alumina with divalent cations, such as $Ca^{2+}$, $Sr^{2+}$, $Ba^{2+}$, $Zn^{2+}$, $Cd^{2+}$, $Pb^{2+}$, $Hg^{2+}$ and $Mn^{2+}$. Most of the divalent beta"-aluminas demonstrate high divalent cationic conductivities of about $10^{-1}(ohm-cm)^{-1}$ at temperatures from about 300° to 400° C. for single crystal materials, suggesting their suitability for use in high temperature secondary cell applications. G. C. Farrington and B. Dunn, "Divalent Beta" Aluminas: High Conductivity Solid Electrolytes for Divalent Cations", Mat. Res. Bull., 15:1773 (1980). The ionic conductivities of $Ca^{2+}$, $Sr^{2+}$ and $Ba^{2+}$ beta"-aluminas are comparable, while the conductivity of $Pb^{2+}$ beta"-alumina is greater and approaches the conductivity of sodium beta"-alumina at temperatures below 25° C. R. Seevers, J. DeNuzzio, and G. C. Farrington, "Ion Transport in $Ca^{2+}$, $Sr^{2+}$, $Ba^{2+}$ and $Pb^{2+}$ Beta"Aluminas", Office of Naval Research Contract N00014-81-K-0526, Technical Report No. 2 (1983). Another report relates the structure of divalent beta"-aluminas to their conductivity. J. O. Thomas, M. Alden, and G. C. Farrington, "The Relationship Betweeen Structure and Ionic Conductivity in Divalent $\beta''$-Aluminas", Solid State Ionics 9 & 10: 301 (1983). Divalent cations are typically substituted for sodium in beta"-alumina by immersion in an appropriate molten salt of the desired divalent cation. E. E. Hellstrom and R. E. Benner, "Preparation and Properties of Polycrystalline Divalent-Cation Beta"-Alumina", Solid State Ionics 11: 125 (1983). Divalent beta"-aluminas are generally stable, they retain the beta"-alumina structure, and they can be reversibly exchanged from sodium beta"-alumina.

Trivalent cations, including $Gd^{3+}$, $N^{3+}$ and $Eu^{3+}$ may also be substantially completely exchanged for sodium ions in beta"-alumina single crystals to provide solid electrolytes having rapid trivalent cation mobility at moderate temperatures. B. Dunn and G. C. Farrington, "Trivalent Ion Exchange In Beta" Alumina", Office of Naval Research Contract N00014-81-K-0526, Technical Report No. 6 (1984). The ionic distribution in trivalent $Gd^{3+}$ beta"-alumina, characterized by X-ray diffraction study, indicates that these materials may have interesting optical properties, although ionic conductivity is relatively low. W. Carrillo-Cabrera, J. O. Thomas and G. C. Farrington, "The Ionic Distribution in Trivalent $Gd^{3+}$ Beta"-Alumina", Solid State Ionics 9 & 10:245 (1983).

Recent experimental developments in high temperature galvanic cells have focused primarily on sodium-sulfur battery systems and lithium alloy-metal sulfide battery systems. The sodium sulfur cells comprise a sodium beta-alumina type electrolyte, highly reactive liquid sodium negative electroactive material, and sodium polysulfide positive electroactive materials. The lithium alloy-nickel sulfide systems currently being developed utilize a molten salt electrolyte. These cell systems typically operate at 350° C. and 450° C., respectively, to promote rapid electrode kinetics, thereby achieving high discharge power densities. The high temperature operation of these cells has been determined by the melting point of the sodium polysulfide oxidant at the cathode of the sodium-sulfur cell and the melting point of the LiCl-KCl molten salt electrolyte used in the lithium alloy-metal sulfide battery. High energy densities for these types of cells are expected since alkali metals are used for the negative electrode in both of the systems.

The sodium-sulfur system is considered by many researchers to be the most promising of the advanced high temperature battery systems. The sodium ion conductivity of sodium beta-alumina type solid electrolyte material allows effective separation to be realized by the highly reactive liquid sodium negative electroactive material and the sodium polysulfide positive electroactive material. One important drawback of this type of system is the containability of molten sodium at 350° C. in the event of a cell leak or accident. In addition, there is some evidence of material degradation of sodium ion conducting beta"-alumina ceramic electrolyte at the negative electrode side upon extended cell cycling, which may lead to cell shorting.

Galvanic cells utilizing iron-doped beta-alumina type cathodes are operable at closer to ambient temperatures than conventional sodium-sulfur beta-alumina systems. Cells comprising sodium negative electrodes, beta-alumina ceramic electrolyte, and sintered beta-alumina positive electrodes in which some of the aluminum sites were replaced by iron in the beta-alumina structure operated at about 120° C. were shown to be electrochemically regenerative. "Galvanic Cells Containing Cathodes of Iron-Doped Beta-Alumina", J. H. Kennedy and A. F. Sammells, J. Electrochem. Soc. 121:1 (1974).

SUMMARY OF THE INVENTION

It is an object of the present invention to provide a high energy density, high temperature battery system which is electrochemically reversible and suitable for applications such as utility load leveling, electric vehicle propulsion and aerospace power source systems.

It is another object of the present invention to provide a high energy density, high temperature cell system which demonstrates good Faradaic efficiency upon extended cell cycling and is relatively safe in the case of a cell rupture or leak.

It is yet another object of the present invention to provide a high energy density, high temperature cell system which is not susceptible to erosion and material degradation at the solid divalent cation conducting electrolyte/negative electrode interface upon extended cell cycling.

It is yet another object of the present invention to provide a high energy density, high temperature cell system wherein the solid electrolyte and solid-state positive electroactive material comprise a monolithic solid-state assembly, with the solid electrolyte exclusively ionically conductive and the positive electrode both ionically and electronically conductive; the negative electroactive material comprises a solid-state material; and an appropriate molten salt is provided as an ionic mediating agent between the solid-state electrolyte and the solid-state negative electroactive material.

The high temperature, high energy density cell system of the present invention comprises a divalent cation conducting solid electrolyte, such as divalent cation conducting beta"-alumina; positive electroactive material, such as a divalent cation conducting beta"-alumina lattice type structure doped with an immobile transition metal species; and solid-state negative electroactive material with an appropriate molten salt provided as an ionic mediating agent between the solid-state negative electroactive material and the divalent cation conducting solid electrolyte. Since a molten salt is provided as an ionic mediating agent between the negative electroactive material and the solid-state electrolyte, material degradation which has been observed in sodium-sulfur type cells at the negative electrode/solid-state electrolyte interface is prevented by the presence of the molten salt. Redox chemistry at the negative electrode according to the present invention occurs at the electroactive material/molten salt interface rather than at an electroactive material/solid electrolyte interface and material degradation is reduced. The positive electrodes utilized in this cell system according to one embodiment may have the same nominal composition as divalent cation conducting beta"-alumina electrolyte, and additionally a significant fraction of the $Al^{3+}$ sites in the beta"-alumina structure may be substituted by transition metal redox species. Transition metal ions may be incorporated into the spinel block of the beta"-alumina solid electrolyte by direct high temperature solid-state reaction.

In an especially preferred embodiment of the present invention, $Ca^{2+}$ beta"-alumina solid electrolyte is in solid-state contact to a transition metal doped $Ca^{2+}$ beta"-alumina positive electrode, with a solid-state negative electrode comprising a calcium alloy, and preferably comprising a silicon containing calcium alloy with a $Ca^{2+}$ molten salt providing ionic mediation the electrolyte and the negative electrode.

The anticipated reactions occurring during discharge at each electrode of, for example, a calcium cell of the present invention can be represented as follows:

(Cathode) Oxidant electrode: $M^{(n+1)} + e^- \rightarrow M^{n+}$ (Anode) Reductant electrode: $Ca \rightarrow Ca^{2+} + 2e^-$ Overall reaction: $Ca + 2M^{(n+1)} \rightarrow Ca^{2+} + 2 M^{n+}$ where M is an immobile transition metal, such as $Fe^{3+}$, $Cr^{3+}$, $Co^{3+}$, and the like located in a beta"-alumina lattice structure of the positive electrode.

Upon electrochemical cycling, the positive electrode material is not expected to undergo any chemical phase change. Electroneutrality is maintained within the overall solid state cathode structure since the electrochemical reduction reaction involves conversion of $M^{3+}$ to $M^{2+}$ followed by migration of a divalent cation from the solid electrolyte bulk toward a site close to the transition metal species.

BRIEF DESCRIPTION OF THE DRAWINGS

The present invention will be described in detail with the aid of the accompanying drawings, in which.

DESCRIPTION OF PREFERRED EMBODIMENTS

Figure 1:
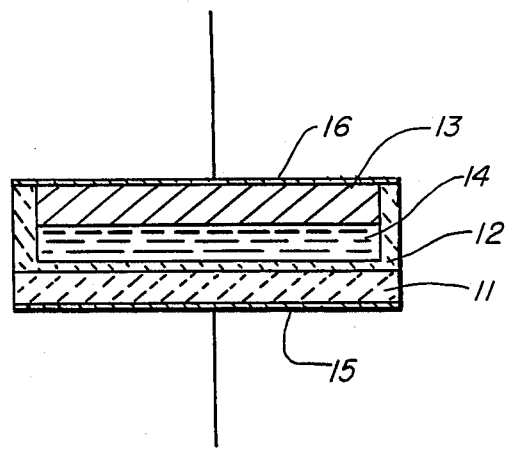
FIG. 1 shows a highly schematic diagram of a high energy density, high temperature cell of the present invention.

As shown in the highly schematic diagram of FIG. 1, high temperature rechargeable cell 10 comprises positive electrode 11 in solid-state contact to solid-state electrolyte 12, and solid-state negative electrode 13 in contact to electrolyte 12 by means of mediating agent 14. Current collectors 15 and 16 are provided to enhance current collection from the positive and negative electrodes, respectively.

Solid-state electrolyte 12 comprises a divalent cation conducting solid and preferably comprises divalent cation conducting beta"-alumina. Divalent beta"-aluminas suitable for use as solid electrolytes according to the present invention include: $Ca^{2+}$ beta"-alumina; $Sr^{2+}$ beta"-alumina; $Ba^{2+}$ beta"-alumina; $Zn^{2+}$ beta"-alumina; $Cd^{2+}$ beta"-alumina; $Pb^{2+}$ beta"-alumina; $Hg^{2+}$ beta"-alumina; $Mn^{2+}$ beta"-alumina; and other divalent cation conducting beta"-aluminas exhibiting similar ionic conductivities. $Ca^{2+}$ beta"-alumina is especially preferred for use in the present invention, but the following descriptions of $Ca^{2+}$ beta"-alumina electrolyte and calcium cells are intended to be illustrative and not limitative of the present invention.

Divalent cation conducting beta"-alumina materials for use as solid-state electrolytes in the present invention preferably comprise the respective lithium and magnesium stabilized materials possessing the following initial nominal composition: $Ca_xLi_yAl_{10.4}O_{17.6}$, and $Ca_xMg_zAl_{10.4}O_{17}$ wherein x is from about 0.65 to about 1.0, and preferably x is from about 0.75 to about 0.90; y is from about 0.20 to about 0.40, and preferably y is from about 0.27 to about 0.33; and z is from about 0.50 to about 0.80, and preferably z is from about 0.60 to about 0.70. Divalent cation conducting beta"-alumina electrolytes may be prepared by heating stoichiometric amounts of the appropriate metal oxides at about 1000° to 1200° C. to effect direct solid-state reactions forming sodium beta''-alumina, and ion exchanging divalent cations for Na+ by immersion of the solid-state sodium beta''-alumina in a divalent cation molten salt. Ion exchange to divalent cation conducting beta''-alumina may also be carried out in situ during cell assembly.

Positive electrode 11 may comprise any positive electroactive material which is compatible with the negative electroactive material and preferably comprises a solid-state divalent cation conducting material which is both ionically and electronically conductive. Suitable divalent cations comprise: $Ca^{2+}$; $Sr^{2+}$; $Ba^{2+}$; $Zn^{2+}$; $Cd^{2+}$; $Pb^{2+}$; $Hg^{2+}$; and the like. $Ca^{2+}$ is especially preferred. The divalent cationic conductivity of positive electrode 11 is, of course, matched to that of solid-state electrolyte 12 so that both materials have approximately the same conductivity with respect to the same divalent cation. Solid-state intercalation compounds such as beta and beta''-aluminas, polysulfide species, and the like, are suitable for use as positive electrodes 11.

According to a preferred embodiment, positive electrode 11 comprises a divalent cation conducting beta''-alumina type lattice structure incorporating a transition metal redox species into immobile $Al^{3+}$ lattice sites. A significant fraction of the $Al^{3+}$ sites in the beta''-alumina spinel block structure are substituted for redox transition metal species such as $Fe^{3+}$, $Cr^{3+}$, $Co^{3+}$, $Ti^{4+}$, $V^{4+}$, $Mn^{3+}$, $Ni^{2+}$, $Cu^{2+}$, and the like. $Fe^{3+}$, $Cr^{3+}$, and $Co^{3+}$ are especially preferred. Any transition metal redox species which imparts sufficient electronic conductivity and provides sufficiently separated electrode potentials to give cells with usable voltages is suitable for use in the present invention. Incorporation of an immobile transition metal redox species into a beta''-alumina type lattice structure may be achieved by direct solid-state reaction between the appropriate metal oxides at elevated temperatures in the atmosphere. After synthesis of the above preferred $Ca^{2+}$ beta''-alumina materials doped with transition metal redox species, they possess the following respective compositions:

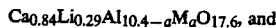

$Ca_{0.84}Li_{0.29}Al_{10.4-a}M_aO_{17.6}$, and

$Ca_{0.83}Mg_{0.67}Al_{10.3-a}M_aO_{17}$ where $M=Fe^{3+}$, $Cr^{3+}$, $Co^{3+}$, $Ti^{4+}$, $V^{4+}$, $Mn^{3+}$, $Ni^{2+}$, $Cu^{2+}$, and the like, and a is from about 1 to about 8 and preferably a is about 5.

Current collection from the positive electrode is preferably achieved by a current collector comprising a metallic paint providing good electronic contact to the cathode, or a vacuum evaporated material such as molybdenum, gold, and the like. Suitable metallic paints may be prepared and utilized as follows: a metallizing mixture comprising 16 gm Mo powder, 4 gm Mn powder, 10 ml carbowax, 5 ml amyl acetate and 5 ml acetone is initially ball-milled for several days; the resulting metallic paint may be applied onto the surfaces of the positive electrode; the paint is preferably allowed to dry for one day at 200° C.; and the whole assembly is then heated to 900° C. under argon for several hours. Positive electrode 11 may be provided in solid-state contact to electrolyte 12 by directly sintering or fusing to provide a monolithic structure.

Negative electrode 13 preferably comprises a solid-state alloy of the corresponding divalent species present in solid-state electrolyte 12, and may comprise Ca and alloys thereof, Sr and alloys thereof, Ba and alloys thereof, Zn and alloys thereof, Cd and alloys thereof, Pb and alloys thereof, Hg and alloys thereof, Mn and alloys thereof, and the like. According to a preferred embodiment, negative electrode 13 comprises Ca or a solid-state alloy thereof. Silicon containing calcium alloys, such as $Ca_2Si$; $CaSi$; $Ca_2Si_{1-x}B_x$; and $Ca_2Si_{1-(x+y)}B_xM_y$ where $M=Mg$ or $Al$, and x and y are both $<1.0$, are especially preferred.

Ionic transport between solid-state negative electrode 13 and solid-state electrolyte 12 is provided by ionic mediating agent 14 comprising an appropriate divalent cation conducting molten salt. The divalent cationic conductivity of ionic mediating agent 14 is, of course, matched to that of solid-state electrolyte 12. Binary calcium halide molten salts such as $CaCl_2$-$CaI_2$ and ternary calcium halide molten salts such as $CaCl_2$-$CaI_2$-$CaBr_2$ are especially preferred for use with $Ca^{2+}$ conducting solid electrolytes. A eutectic molten salt comprising $CaCl_2(51.4^m/o)$-$CaI_2$ is especially preferred. Suitable molten salts for use with other divalent cation conducting electrolytes are known to the art.

Current collection from the negative electrode is preferably achieved by a current collector comprising low carbon steel, molybdenum, high chromium steel, and the like.

According to one especially preferred cell configuration of the present invention, solid-state negative electrode 13 comprises $Ca_2Si$; molten salt mediating agent 14 comprises $CaCl_2(51.4^m/o)$-$CaI_2$ eutectic; solid-state electrolyte 12 comprises $Ca^{2+}$ beta''-alumina and solid-state positive electrode 11 comprises $Ca_{0.84}Li_{0.29}Fe_{5.41}Fe_5O_{17.58}$. This cell configuration possesses an open-circuit voltage of about 1.67 V at 590° C. and demonstrates excellent electrochemical reversibility.

Figure 2:
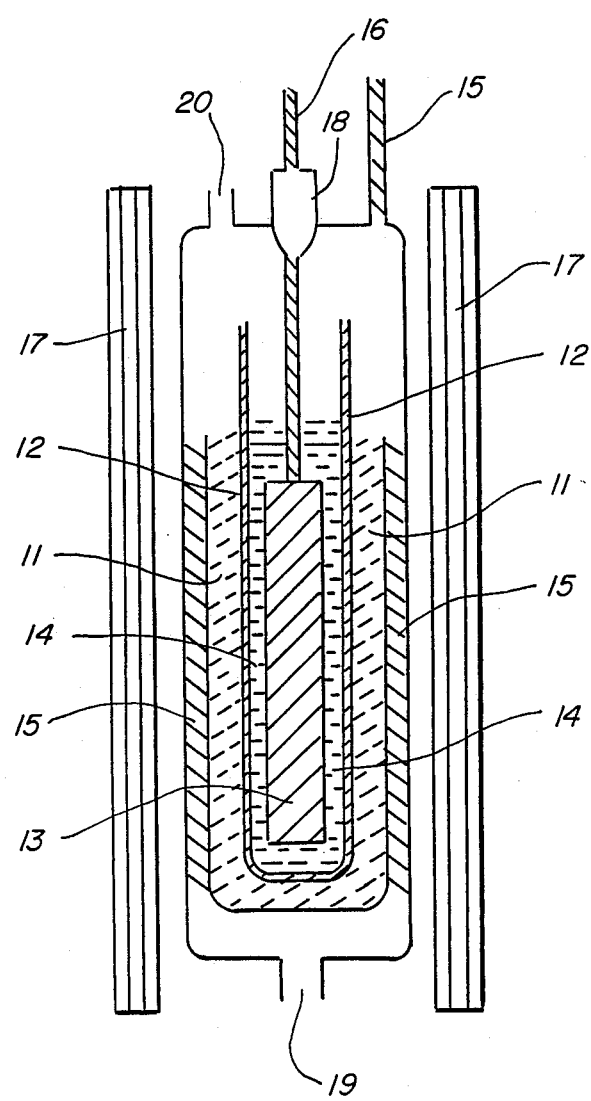
FIG. 2 shows the cell of the present invention embodied in a tubular electrochemical cell arrangement.

FIG. 2 shows a tubular electrochemical cell arrangement suitable for use with high temperature cells of the present invention. Solid-state negative electrode 13 is provided in the central area of the cell and is immersed in divalent cation conducting molten salt mediating agent 14 which is contained by electrolyte 12 comprising divalent cation conducting solid-state material having a high ionic conducitivity, solid-state electrolyte 12 being in solid-state contact to positive electrode 11 comprising a solid-state divalent cation conducting material having a high ionic and electronic condutivity. Current collector 15 is provided to achieve current collection from the positive electrode and current collector 16 is provided to achieve current collection from the central negative electrode 13. Suitable electrode feed through means 18, providing a seal from the atmosphere, are known to the art. Gas inlet 19 and gas outlet 20 may be provided for passage of an inert gas, such as argon.

Heating elements 17 are provided peripherally to the exterior surface of the tubular electrochemical cell arrangement shown in FIG. 2 to provide the required cell operating temperatures. Preferred cell operating temperatures depend upon the melting point of the molten salt mediating agent 14 utilized. For example, for cells utilizing the eutectic binary calcium halide molten salt $CaCl_2$-$CaI_2$, cell operating temperatures of about 590° C. are suitable. Operating temperatures for cells of the present invention are chosen to provide the molten salt mediating agent in a molten, liquid form, while maintaining the solid-state electrodes and electrolyte in their solid-state forms. The high temperature cells according to this invention are preferably operated without direct contact to the atmosphere. The high temperature cell systems of the present invention may be adapted to many other suitable configurations, and a plurality of cells may be assembled to provide high energy density, high temperature storage batteries.

The following example sets forth specific cell components and their method of manufacture for the purpose of more fully understanding preferred embodiments of the present invention and is not intended to limit the invention in any way.

EXAMPLE

A cell of the general type shown in FIG. 1 was fabricated according to the following procedures. Sodium ion conducting beta''-alumina recessed pellets were fabricated by Ceramatec Inc., located at 163 West 1700 South, Salt Lake City, Utah 84115, and possessed the initial nominal composition:

$Na_{1.68}Li_{0.29}Al_{10.44}O_{17.58}$.

These pellets were 16 mm in diameter and 4 mm thick. In the center of each of these pellets, a circular recess 13 mm in diameter and 3 mm deep was machined. This resulted in the solid electrolyte possessing a wall thickness of 1 mm. between the positive and negative electrodes in the galvanic cells.

Ion exchange of $Ca^{2+}$ for sodium was accomplished by total immersion of the recessed pellet in molten $CaCl_2$ at about 800° C. for about 60 hours. This was performed in a muffle furnace using a ceramic crucible containing a lid. Removal of the exchanged recessed pellets was accomplished by plucking out of the melt at temperature and allowing to cool close to room temperature. The recessed pellet was then thoroughly rinsed successively with distilled water and methanol, and after heating again to about 700° C. in the atmosphere, introduced (while still warm) into a vacuum desiccator over molecular sieves.

Preparation of positive electrode materials comprising transition metal doped beta''-alumina type structures was achieved by initially ball milling stoichiometric amounts of $Al_2O_3$, $Li_2CO_3$ and $Fe_2O_3$, together with CaO to provide divalent conductivity. This was performed over 72 hours for each batch ($\approx 50$ g) using an alumina ball mill and ethylene glycol as a grinding aid. The final particle size of the ground material was in the 1–2.5 micron range. This powder was then fired at 1000° C. for four hours to promote solid-state reaction and achieve a first approximation to a beta''-alumina type structure. After this initial firing the powder was returned to the alumina ball mill and reground together with 2 ml of a 10 $^w$/o carbowax 1000 solution, as a binding agent, for a further 48 hours. Using this material cathode pellets were pressed at 80,000 psi in a KBr type die using a Carver Laboratory press. These pellets were then initially heated for 2-3 hours at 200° C. for removal of the binding agent, followed by firing at 1000° C. for four hours.

The solid-state negative electrode comprised $Ca_2Si$, and the mediating agent comprised the binary eutectic calcium halide molten salt $CaCl_2(51.4^m/o)$-$CaI_2$.

Excellent electrochemical reversibility was observed for the cell $Ca_2Si/CaCl_2$, $CaI_2/Ca^{2+}$ beta''-alumina/46-$^m$/o $Fe_2O_3$-beta''-alumina. Upon extended cycling Faradaic efficiencies approaching theoretical could be observed. The initial open-circuit for this specific cell was around 1.67 V. Examination of the solid electrolyte in the area of the recess indicated complete stability for the molten salt/solid electrolyte interface region for a cell subjected to repeated charge/discharge cycling.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A high temperature electrochemical cell comprising:
   a solid-state divalent cation conducting electrolyte;
   a positive electrode in contact with said electrolyte;
   a solid-state negative electrode contacting a divalent cation conducting molten salt mediating agent providing ionic mediation between said solid-state negative electrode and said solid-state electrolyte.

2. A high temperature electrochemical cell according to claim 1 wherein said divalent cation is selected from the group consisting of: $Ca^{2+}$; $Sr^{2+}$; $Ba^{2+}$; $Zn^{2+}$; ;$Cd^{2+}$;$Pb^{2+}$; $Hg^{2+}$; and $Mn^{2+}$.

3. A high temperature electrochemical cell according to claim 1 wherein said electrolyte is selected from the group consisting of: $Ca^{2+}$ beta''-alumina; $Sr^{2+}$ beta''-alumina; $Ba^{2+}$ beta''-alumina; $Zn^{2+}$ beta''-alumina; $Cd^{2+}$ beta''-alumina; $Pb^{2+}$ beta''-alumina; $Hg^{2+}$ beta''-alumina; and $Mn^{2+}$ beta''-alumina.

4. A high temperature electrochemical cell according to claim 1 wherein said divalent cation is $Ca^{2+}$ and said solid-state electrolyte comprises $Ca^{2+}$ beta''-alumina.

5. A high temperature electrochemical cell according to claim 4 wherein said solid-state electrolyte is selected from the group consisting of: $Ca_xLi_yAl_{10.4}O_{17.6}$ and $Ca_xMg_z Al_{10.4}O_{17}$, where x is from about 0.65 to about 1.0; y is from about 0.20 to about 0.40 and z is from about 0.50 to about 0.80.

6. A high temperature electrochemical cell according to claim 3 wherein said positive electrode comprises a solid-state divalent cation conducting transition metal doped beta''-alumina.

7. A high temperature electrochemical cell according to claim 6 wherein said transition metal is selected from the group consisting of $Fe^{3+}$; $Cr^{3+}$; $Co^{3+}$; $Ti^{4+}$; $V^{4+}$; $Mn^{3+}$; $Ni^{2+}$; and $Cu^{2+}$.

8. A high temperature electrochemical cell according to claim 6 wherein said transition metal doped solid-state positive electrode is selected from the group consisting of: $Ca_{0.84}Li_{0.29}Al_{10.4-a}Fe_aO_{17.16}$; $Ca_{0.83}Mg_{0.67}Al_{10.3-a}Fe_aO_{17}$; $Ca_{0.84}Li_{0.29}Al_{10.4-a}Cr_aO_{17.6}$; $Ca_{0.83}Mg_{0.67}Al_{10.3-a}Co_aO_{17}$; $Ca_{0.84}Li_{0.29}Al_{10.4-a}Co_aO_{17.6}$; and $Ca_{0.83}Mg_{0.67}Al_{10.3-a}Co_aO_{17}$ where a is from about 1 to about 8.

9. A high temperature electrochemical cell according to claim 6 wherein said solid-state negative electrode is selected from the group consisting of: Ca and alloys thereof; Sr and alloys thereof; Ba and alloys thereof; Zn and alloys thereof; Cd and alloys thereof; Pb and alloys thereof; Hg and alloys thereof; and Mn and alloys thereof.

10. A high temperature electrochemical cell according to claim 9 wherein said solid-state negative electrode comprises a silicon-containing calcium alloy.

11. A high temperature electrochemical cell according to claim 10 wherein said solid-state negative electrode is selected from the group consisting of: $Ca_2Si$;

CaSi; $Ca_2Si_{1-x}B_x$; $Ca_2Si_{1-(x+y)}B_xMg_y$; and $Ca_2Si_{1-(x+y)}B_xAl_y$.

12. A high temperature electrochemical cell according to claim 10 wherein said molten salt mediating agent comprises a calcium halide molten salt.

13. A high temperature electrochemical cell according to claim 12 wherein said molten salt mediating agent is selected from the group consisting of: $CaCl_2$; $CaCl_2$-$CaI_2$; and $CaCl_2$-$CaI_2$-$CaBr_2$.

14. A high temperature electrochemical cell according to claim 12 wherein said molten salt mediating agent is initally a eutectic composition.

15. A high temperature electrochemical cell according to claim 1 wherein said solid-state electrolyte comprises $Ca^{2+}$beta″-alumina; said positive electrode comprises $Ca_{0.84}Li_{0.29}Al_{5.4}Fe_5O_{17.58}$; said solid-state negative electrode comprises $Ca_2Si$; and said molten salt mediating agent comprises $CaCl_2$-$CaI_2$ eutectic salt.

16. A high temperature electrochemical cell according to claim 1 additionally comprising a current collector in contact to said positive electrode and a current collector in contact to said solid-state negative electrode.

17. A high temperature electrochemical cell according to claim 16 wherein said positive electrode current collector is selected from the group consisting of: a metallic paint and molybdenum; and said negative electrode current collector is selected from the group consisting of: low carbon steel, molybdenum, and high chromium steel.

18. A high temperature electrochemical cell according to claim 1 in a concentric tubular arrangement wherein said solid-state negative electrode is aligned at a central area of said cell along a central axis and is immersed in said molten salt mediating agent, said molten salt mediating agent is contained by said solid-state electrolyte, and said solid-state electrolyte is in contact to said positive electrode.

19. A high temperature electrochemical cell according to claim 1 additionally comprising external heating means.

20. A high temperature electrochemical cell according to claim 1 wherein said solid-state negative electrode comprises a calcium alloy; said molten salt mediating agent comprises a calcium halide eutectic; said solid-state electrolyte comprises a $Ca^{2+}$beta″-alumina; and said positive electrode comprises a transition metal doped $Ca^{2+}$beta″-alumina.

* * * * *